US011449079B2

(12) United States Patent
Lin et al.

(10) Patent No.: US 11,449,079 B2
(45) Date of Patent: Sep. 20, 2022

(54) GENERALIZABLE ROBOT APPROACH CONTROL TECHNIQUES

(71) Applicant: Adobe Inc., San Jose, CA (US)

(72) Inventors: Zhe Lin, Fremont, CA (US); Xin Ye, Tempe, AZ (US); Joon-Young Lee, Milpitas, CA (US); Jianming Zhang, Campbell, CA (US)

(73) Assignee: ADOBE INC., San Jose, CA (US)

( * ) Notice: Subject to any disclaimer, the term of this patent is extended or adjusted under 35 U.S.C. 154(b) by 586 days.

(21) Appl. No.: 16/262,448

(22) Filed: Jan. 30, 2019

(65) Prior Publication Data

US 2020/0241574 A1 Jul. 30, 2020

(51) Int. Cl.
G05D 1/00 (2006.01)
G05D 1/12 (2006.01)
G05D 1/02 (2020.01)
G06T 7/70 (2017.01)
G06T 7/10 (2017.01)

(52) U.S. Cl.
CPC .............. G05D 1/12 (2013.01); G05D 1/0088 (2013.01); G05D 1/0221 (2013.01); G05D 1/0246 (2013.01); G06T 7/10 (2017.01); G06T 7/70 (2017.01); G05D 2201/0217 (2013.01); G06T 2207/10028 (2013.01)

(58) Field of Classification Search
CPC ...... G05D 1/12; G05D 1/0088; G05D 1/0221; G05D 1/0246; G05D 2201/0217; G06T 7/10; G06T 7/70; G06T 2207/10028
USPC ........................................................ 700/245
See application file for complete search history.

(56) References Cited

U.S. PATENT DOCUMENTS

| 2005/0226711 | A1* | 10/2005 | Schnoor ............... B65G 47/917 414/736 |
| 2017/0190051 | A1* | 7/2017 | O'Sullivan ............ G06N 20/00 |
| 2019/0217476 | A1* | 7/2019 | Jiang ...................... B25J 9/1697 |
| 2019/0279383 | A1* | 9/2019 | Angelova ............. G06N 3/0454 |
| 2020/0234071 | A1* | 7/2020 | Yuvaraj ..................... G06T 7/73 |
| 2021/0365716 | A1* | 11/2021 | Li ........................... H04N 5/247 |

OTHER PUBLICATIONS

Chen, et al., "Encoder-Decoder with Atrous Separable Convolution for Semantic Image Segmentation", arXiv preprint arXiv:1802.02611, Aug. 22, 2018, 18 pages.

(Continued)

*Primary Examiner* — Tyler J Lee
*Assistant Examiner* — Tiffany P Ohman
(74) *Attorney, Agent, or Firm* — F. Chau & Associates, LLC

(57) ABSTRACT

Systems and techniques are described that provide for generalizable approach policy learning and implementation for robotic object approaching. Described techniques provide fast and accurate approaching of a specified object, or type of object, in many different environments. The described techniques enable a robot to receive an identification of an object or type of object from a user, and then navigate to the desired object, without further control from the user. Moreover, the approach of the robot to the desired object is performed efficiently, e.g., with a minimum number of movements. Further, the approach techniques may be used even when the robot is placed in a new environment, such as when the same type of object must be approached in multiple settings.

20 Claims, 6 Drawing Sheets

(56) References Cited

OTHER PUBLICATIONS

Chen, et al., "Scheduling Threads for Constructive Cache Sharing on CMPs", Proceedings of the Nineteenth Annual ACM Symposium on Parallel Algorithms and Architectures, ACM, Jun. 9-11, 2007, pp. 105-115.
Chollet, "Xception: Deep Learning with Depthwise Separable Convolutions", arXiv:1610.02357v3, Apr. 4, 2017, 8 pages.
Couprie, et al., "Indoor Semantic Segmentation Using Depth Information", arXiv:1301.3572v1, Jan. 16, 2013, 7 pages.
Das, et al., "Embodied Question Answering", IEEE/CVF Conference on Computer Vision and Pattern Recognition, DOI 10.1109/CVPR.2018.00008, 2018, pp. 1-10.
Donahue, et al., "DeCAF: A Deep Convolutional Activation Feature for Generic Visual Recognition", Proceedings of the 31st International Conference on Machine Learning, Beijing, China, 2014, 9 pages.
Dosovitskiy, et al., "Learning to Act by Predicting the Future", arXiv:1611.01779v1, Nov. 6, 2016, 14 pages.
Eigen, et al., "Predicting Depth, Surface Normals and Semantic Labels with a Common Multi-Scale Convolutional Architecture", Proceedings of IEEE International Conference on Computer Vision (ICCV), 2015, pp. 2650-2658.
Fu, et al., "Deep Ordinal Regression Network for Monocular Depth Estimation", IEEE/CVF Conference on Computer Vision and Pattern Recognition, Salt Lake City, UT, 2018, pp. 2002-2011.
Ghosh, et al., "Divide-And-Conquer Reinforcement Learning", arXiv Preprint, arXiv:1711.09874v1, Nov. 27, 2017, 11 pages.
Gordon, et al., "IQA: Visual Question Answering in Interactive Environments", IEEE/CVF Conference on Computer Vision and Pattern Recognition, Salt Lake City, UT, 2018, pp. 4089-4098.
Gu, et al., "Deep Reinforcement Learning for Robotic Manipulation With Asynchronous Off-Policy Updates", IEEE International Conference on Robotics and Automation (ICRA), Singapore, May 29-Jun. 3, 2017, pp. 3389-3396.
He, et al., "Deep Residual Learning for Image Recognition", IEEE Conference on Computer Vision and Pattern Recognition (CVPR), Las Vegas, NV, 2016, pp. 770-778.
Jaderberg, et al., "Reinforcement Learning with Unsupervised Auxiliary Tasks", arXiv:1611.05397v1, Nov. 16, 2016, 14 pages.
Jafari, et al., "Analyzing Modular CNN Architectures for Joint Depth Prediction and Semantic Segmentation", IEEE International Conference on Robotics and Automation (ICRA), Singapore, May 29-Jun. 3, 2017, pp. 4620-4627.
Laina, et al., "Deeper Depth Prediction with Fully Convolutional Residual Networks", Fourth International Conference an 3D Vision, Stanford, CA, 2016, pp. 239-248.
Liu, "Beyond Pixels: Exploring New Representations and Applications for Motion Analysis", Ph.D. dissertation, MIT, Jun. 2009, 164 pages.
Mirowski, et al., "Learning to Navigate in Complex Environments", arXiv preprint arXiv: 1611.03673v3, Jan. 13, 2017, 16 pages.
Mnih, et al., "Asynchronous Methods for Deep Reinforcement Learning", Proceedings of the 33rd International Conference on Machine Learning, New York, NY, USA, 2016, 19 pages.
Mnih, et al., "Human-Level Control through Deep Reinforcement Learning", Macmillan Publishers Limited, Nature, vol. 518, No. 7540, Feb. 26, 2015, 13 pages.
Mnih, et al., "Playing Atari With Deep Reinforcement Learning", arXiv:1312.5602v1 Dec. 19, 2013, 9 pages.
Pathak, et al., "Curiosity-Driven Exploration by Self-supervised Prediction", Proceedings of the 34th International Conference on Machine Learning, Sydney, Australia, 2017, 12 pages.
Russakovsky, et al., "ImageNet Large Scale Visual Recognition Challenge", International Journal of Computer Vision, vol. 115, No. 3, arXiv: 1409.0575v3, Jan. 30, 2015, 43 pages.
Song, et al., "Predicting Human Intention in Visual Observations of Hand/Object Interactions", 2013 IEEE International Conference on Robotics and Automation, Karlsruhe, Germany, May 6-10, 2013, pp. 1608-1615.
Wang, et al., "Sample Efficient Actor-Critic With Experience Replay", arXiv:1611.01224v2, Jul. 10, 2017, 20 pages.
Wang, et al., "Towards Unified Depth and Semantic Prediction from a Single Image", Proceedings of the IEEE Conference on Computer Vision and Pattern Recognition, pp. 2800-2809.
Wu, et al., "Building Generalizable Agents With a Realistic and Rich 3D Environment", arXiv:1801.02209v2, Apr. 8, 2018, 15 pages.
Ye, et al., "Active Object Perceiver: Recognition-Guided Policy Learning for Object Searching on Mobile Robots", 2018 IEEE/RSJ International Conference on Intelligent Robots and Systems (IROS), Madrid, Spain, Oct. 1-5, 2018, pp. 6857-6863.
Zhu, et al., "Target-Driven Visual Navigation in Indoor Scenes Using Deep Reinforcement Learning", 2017 IEEE International Conference on Robotics and Automation (ICRA), Singapore, May 29-Jun. 3, 2017, pp. 3357-3364.

* cited by examiner

GENERALIZABLE ROBOT APPROACH CONTROL TECHNIQUES

TECHNICAL FIELD

This description relates to robot control systems for causing robots to approach designated objects.

BACKGROUND

Robots are useful in a wide variety of contexts and settings. For example, robots may be used to perform repetitive tasks that were previously required to be performed by humans. Robots may be used to provide assistance to elderly or infirm individuals in performing daily tasks. In further examples, robots may be used to perform dangerous tasks on behalf of human users, thereby protecting the human users.

In these and many other use cases for robots, it may be desirable for a robot to approach a specified object, and perform some function with respect to the specified object. For example, a robot may be required to approach an object in order to identify, manipulate, or retrieve the object.

It is possible for human users to remotely control actions of robots in approaching desired objects. However, such remote control is not always feasible or desirable. For example, an elderly or infirm user may be unable to provide such control, or a robot may be required to operate outside of a vision of a human user.

More generally, increasing an autonomy of robot operation provides many possible advantages in the above, and many other, use cases. To this end, efforts have been made to use machine learning to govern robot operations. However, such efforts are generally overly limited to specific environments or contexts. As a result, robots trained to provide a function in one environment may have little or no ability to provide the same or similar function in another environment.

In particular, a robot may be trained to approach an object in a specific environment. However, if the robot is tasked with approaching the same/similar object in a different environment, or with approaching a different object in the original environment, the robot may be unable to do so efficiently, without being re-trained.

SUMMARY

According to one general aspect, a computer program product is tangibly embodied on a non-transitory computer-readable storage medium and includes instructions. When executed by at least one computing device, the instructions are configured to cause the at least one computing device to receive an approach request identifying an object within an environment to be approached using a movement system of a robot, obtain an image of the environment, including the object, from a camera of the robot, and determine, from the image and using at least one convolutional neural network, a semantic segmentation in which image pixels of the image corresponding to the object are labeled as corresponding to the object, and a depth map in which the image pixels of the image corresponding to the object are associated with a distance of the object from the robot. When executed, the instructions are further configured to cause the at least one computing device to select a movement action executable by the movement system of the robot, based on the semantic segmentation and on the depth map, and execute the movement action to respond to the approach request and move the robot toward the object within the environment.

According to another general aspect, a robot includes a movement system configured to receive an approach request to move the robot and approach an object within an environment, a camera configured to capture an image of the object within the environment, and a control system configured to fulfill the approach request including executing iterations of moving the robot towards the object through a plurality of iterative movements until an approach success condition is reached. The iterations include determining a first semantic segmentation, a first depth map, and a first state of the robot, relative to the object, using a first image from the camera, determining a first movement action of the robot, using the first semantic segmentation, the first depth map, and the first state, and executing the first movement action of the robot. The iterations further include determining a second semantic segmentation, a second depth map, and a second state of the robot, relative to the object, using a second image from the camera, determining a second movement action of the robot, using the second semantic segmentation, the second depth map, and the second state, relative to the first state, and executing the second movement action of the robot.

According to another general aspect, a method includes receiving an approach request identifying an object within an environment to be approached using a movement system of a robot, obtaining an image of the environment, including the object, from a camera of the robot, and determining, from the image and using at least one convolutional neural network, a semantic segmentation in which image pixels of the image corresponding to the object are labeled as corresponding to the object, and a depth map in which the image pixels of the image corresponding to the object are associated with a distance of the object from the robot. The method further includes selecting a movement action executable by the movement system of the robot, based on the semantic segmentation and on the depth map, and executing the movement action to respond to the approach request and move the robot toward the object within the environment.

The details of one or more implementations are set forth in the accompanying drawings and the description below. Other features will be apparent from the description and drawings, and from the claims.

DETAILED DESCRIPTION

Figure 1:
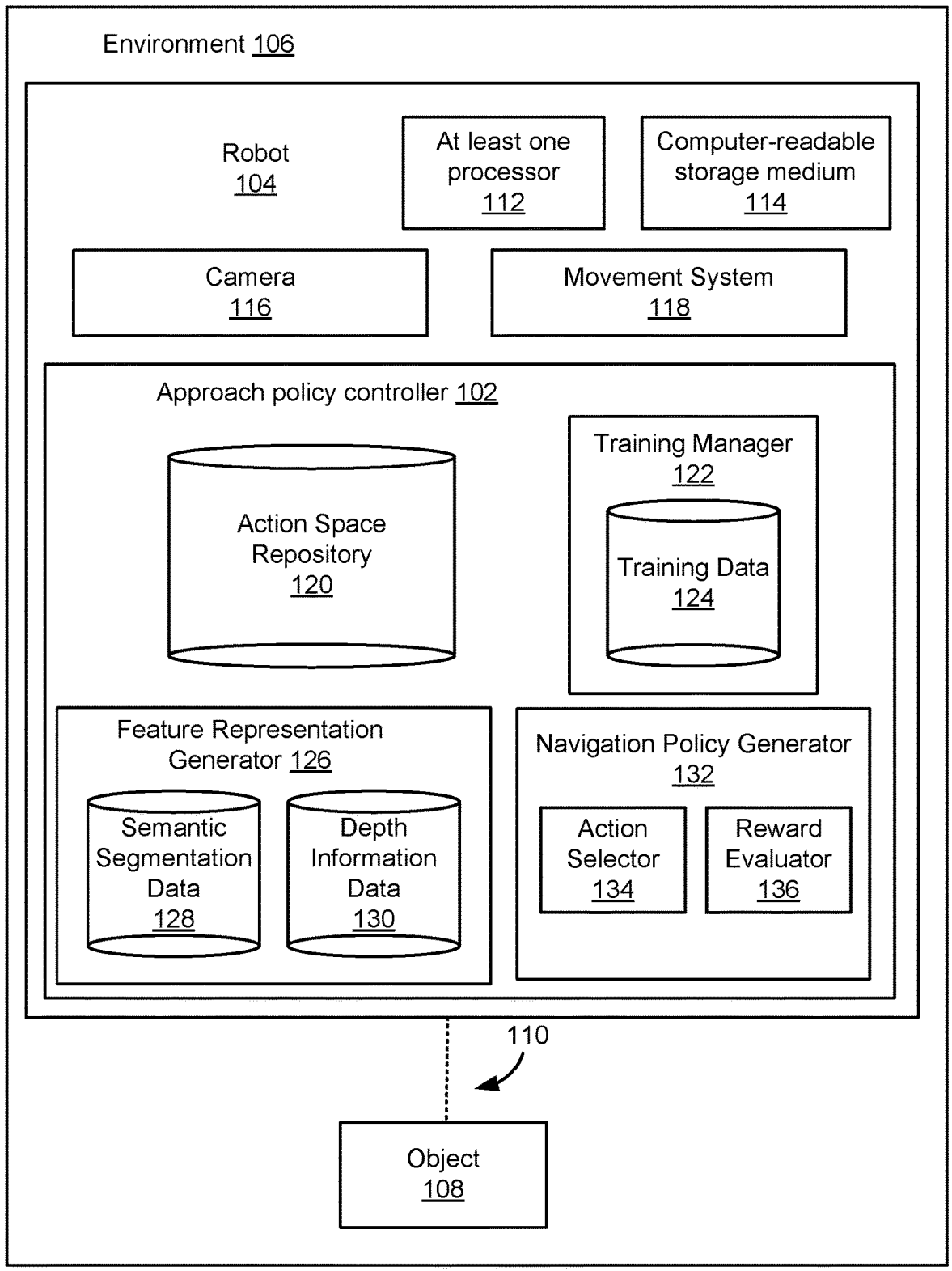
FIG. 1 is a block diagram of a system for robot approach control techniques.

This document describes systems and techniques that provide for generalizable approach policy learning and implementation for robotic object approaching. Such systems and techniques overcome technical challenges of previous systems and techniques, and improve the process(es) to perform related automated processing. For example, the described techniques provide fast and accurate approaching of a specified object, or type of object, in many different environments.

For example, the described techniques enable a robot to receive an identification of an object or type of object from a user, and then navigate to the desired object, without further control from the user. Moreover, the approach of the robot to the desired object is performed efficiently, e.g., with a minimum number of movements. Further, the approach techniques may be used even when the robot is placed in a new environment, such as when the same type of object must be approached in multiple settings.

Such described robot approach techniques utilize an efficient, fast, accurate, complete, and widely-applicable algorithm(s) for detecting and identifying objects in a manner that is largely or completely independent of the environments in which the objects may be found, and for identifying navigation actions for approaching such objects when requested to do so by users.

For example, robots intended to be used to provide assistance to the elderly or infirm may be used in many different homes. Using the techniques described herein, such robots may approach common objects within such homes, such as refrigerators or tables, without requiring training that is specific to each of the different homes.

The described techniques utilize multiple machine learning algorithms, which are straightforward to train, and which require minimal sensors and associated input parameters. For example, the algorithms may operate to approach a specified object based on images received from a single camera.

Moreover, the algorithms are efficient. For example, the algorithms may be trained to identify a semantic label and a perceived depth of an object to be approached, simultaneously or in parallel.

In example implementations, the described techniques operate in an iterative manner to execute a robotic approach. For example, based on an identification of an object and on an image received from a camera, the robot may identify the object and its current depth (e.g., distance from the robot). Using a trained navigation policy (machine learning algorithm), the robot may select a navigation or movement action (such as move forward, or rotate), and then execute and evaluate that action.

This process may be repeated, using the evaluation of the executed action. Put another way, the robot may iteratively obtain an image, determine a presence and distance of a desired object within the image, attempt to move toward the object, evaluate the attempt, and then execute the subsequent iteration using the evaluation of the attempt of the preceding iteration(s) to assist in determining the next attempt (e.g., movement).

The systems and techniques described herein advantageously improve existing technology areas. For example, as described, robot control techniques are improved. Further, the systems and techniques may be used for a more automated and more efficient and faster approach to approaching objects using a robot.

FIG. 1 is a block diagram of a system 100 for robot approach control techniques. In the example of FIG. 1, an approach policy controller 102 is configured to provide many of the features and advantages described above, and set forth in more detail below, with respect to FIGS. 1-8.

In particular, as shown, FIG. 1 illustrates a robot 104 that is mobile within an environment 106, and that is configured to move under a control of the approach policy controller 102 in order to approach an object 108 within the environment 106.

More particularly, the approach policy controller 102 is configured to determine an approach path 110 between the robot 104 and the object 108. As also described in detail below, the goal of the approach policy controller 102 is to select and execute the approach path 110 as quickly and efficiently as possible, even when the robot 104 has not previously executed within, or been trained in the context of, the specific environment 106.

For example, in some example implementations, the approach policy controller 102 may attempt to find the approach path 110 as the shortest distance between the robot 104 and the object 108, taking into account any intervening obstacles. In other example implementations, the approach policy controller 102 may be configured to optimize resources of the robot 104, such as processing or power resources, even if such optimizations result in marginally longer distances or times being associated with the approach path 110. In these and various other example implementations described herein, the approach policy controller 102 enables a highly generalizable approachability for the robot 104, across a wide range of environments and objects, and/or with a minimal amount of hardware and other resources to implement the robot 104.

In the example of FIG. 1, the robot 104 should be understood to represent virtually any moveable object that may be configured to implement the approach policy controller 102 to identify and execute the approach path 110 to approach the object 108 within the environment 106. For example, the robot 104 may include at least one processor 112, as well as at least one non-transitory computer-readable storage medium 114. For example, the at least one processor 112 may represent one or more central processing units (CPUs), as well as one or more graphical processing units (GPUs). The non-transitory computer-readable storage medium 114 should similarly be understood to represent two or more types of computer memories that may be used to store instructions and/or data. Such memories should be understood to represent various types of short-term and long-term memories that may be available for use by the robot 104, including memories that are internal to the at least one processor 112.

The robot 104 may also have various types of input and output systems, various examples of which are described below. In particular, in FIG. 1, the robot 104 is illustrated as including at least one camera 116, which represents any image sensing device that is capable of capturing an image of, or within, the environment 106, including the object 108.

FIG. 1 also illustrates the robot 104 as including a movement system 118. Implementations of the movement system 118 may vary widely, depending upon a general construction and intended use of the robot 104, some examples of which are described herein. For purposes of FIG. 1, the movement system 118 represents a plurality of sub-systems of the robot 104 that receive movement requests of various types, along with associated hardware and software designed and configured to enable implementation of such movement requests.

Of course, the robot 104 represents a highly generalized and simplified example of many different types of robots. Such robots may have many different types of common components that are not explicitly illustrated in FIG. 1 for the sake of brevity, but may be referenced herein, or otherwise understood to be potentially included within the robot 104. For example, the robot 104 may include one or more power supplies, such as a battery and charging apparatus. In other examples, various network interfaces may be included within the robot 104. In various examples, such network interfaces may be useful for remote programming, or other operations, with respect to the robot 104, including communicating movement requests to the movement system 118 and training and otherwise implementing the approach policy controller 102.

The robot 104 should be understood to represent a wide range of types of robots, including general purpose robots and highly specialized robots. As such, the robot 104 should be understood to potentially include many different types of inputs, provide many different implementations of the movement system 118, and include many different types of output systems and associated actions. For example, in addition to the camera 116, the robot 104 may include other input sensors, such as auditory sensors, pressure sensors, thermometers, accelerometers, gyroscopes, or position sensors (e.g., using a global positioning system (GPS)).

These and other types of inputs, including the network interfaces referenced above, alone or in combination, may be used to provide implicit or explicit movement commands to the movement system 118. During general operation, the movement system 118 may be configured to provide various types of movements, including executing the approach path 110, as well as other movement-related functions of the robot 104.

For example, in addition to the approach control techniques described herein, the robot 104 may be configured to execute search-related functions. During search operations, it is typically assumed that the robot 104 may be partially or completely incapable of detecting a searched-for object at a time of commencement of a search. For example, a searched-for object may be initially out of view of the camera 116. During search operations, the robot 104 may be configured to utilize the movement system 118 and associated input/output systems of the robot 104 to execute one or more search algorithms in an attempt to locate and identify the searched-for object.

It will be appreciated that such search operations may be distinguished from the approach control techniques described herein, in which it is generally assumed that the object 108 is within a field of view of the camera 116, and identifiable by the approach policy controller 102 as representing an object, or type of object, to be approached.

Of course, search algorithms, and other robot control algorithms not specifically described herein, may be implemented in conjunction with the approach techniques described herein. For example, a search controller of the robot 104 may be initially tasked with searching for the object 108 within the environment 106. Upon successful completion of the search and identification of the object 108, the approach policy controller 102 may proceed with determining and executing the approach path 110.

In order to execute the approach path 110, as well as various other movement patterns within the environment 106, the movement system 118 may include various types of hardware and software resources usable within the environment 106, or similar types of environments. As the robot 104 has been described as representing robots ranging from general-purpose robots to highly-specialized robots, the environment 106 will similarly be understood to represent many different types of physical settings.

For example, the environment 106 may represent an indoor environment, or an outdoor environment. Outdoor environments may be land-based, water-based, or air-based. Environments may be defined more specifically within these and other categories. For example, land-based outdoor environments may be defined with respect to roads, paths, sidewalks, or fields.

Indoor environments may similarly represent a wide range of potential indoor settings. For example, such indoor environments may include small apartments, houses or office buildings, or large warehouses. As with outdoor environments, such indoor environments may include, or be defined with respect to, various typical interior characteristics, such as, e.g., stairs, carpets, or floors.

As the environment 106 is widely representative, as just described, the object 108 will similarly be understood to represent virtually any object that may be desired to be approached within any corresponding environment. For example, the object 108 may represent a person, animal, household item, or business asset (e.g., equipment, or inventory). Further specific examples of the environment 106 and the object 108 are provided in detail below, or would be apparent.

As referenced above, the movement system 118 may represent one or more of any suitable type of hardware and software components that may be desirable for use in navigating the environment 106. As the environment 106 may vary widely, as described above, the movement system 118 may include, e.g., wheels, treads, legs (e.g., bipedal or quadrupedal), or any other type of component suitable for moving the robot 104 in the context of a land-based environment. Similarly, the robot 104 may be configured to float or fly, as needed. For example, the movement system 118 may include propellers, such as when the robot 104 represents a drone.

As referenced above, although not explicitly illustrated in FIG. 1, the robot 104 may also include, or utilize, various hardware and software components for executing corresponding functionalities of the robot 104. For example, the robot 104 may be configured to pick up, transport, or otherwise manipulate objects, such as the object 108. Thus, the robot 104 may include arms, fingers/pincers, and other components for performing such manipulations, as needed, and/or compartments or surfaces for transporting objects from one location to another.

Thus, the system 100 of FIG. 1 should be understood to represent essentially any robotic system, including robots in human or animal form, automated automobiles and other vehicles, drones, and various other robotic systems presumed to have task-relevant form factors. In all such scenarios, as described herein, the approach policy controller 102 is capable of providing a generalizable approach policy to identify and execute the approach path 110 and thereby approach the object 108.

For example, in the example of FIG. 1, the approach policy controller 102 is illustrated as including, or having access to, an action space repository 120. As described in detail below, the action space repository 120 generally represents all relevant movement actions that are available to the robot 104 in identifying and executing the approach path 110. In general, the action space repository 120 includes a plurality of discrete movement actions, or continuous movement actions that may be divided into discrete movement actions, as needed.

Such available movement actions will generally correspond to one or more aspects of the movement system 118, as well as to the particular environment 106. For example, if the movement system 118 includes wheels, then a movement action may be defined in terms of a discrete number of rotations of the wheels. If the robot 104 includes legs, then corresponding movement actions may be defined in terms of number of steps taken by the legs.

Of course, similar discrete movement actions may be defined with respect to any particular type of movement system being used. Additionally, or alternatively, discrete movement actions may be defined in terms of a distance moved by the robot 104 during the movement action, where such movements may be tracked using various known techniques, some of which are referenced herein. Such movement actions may be defined in vertical or horizontal directions, or as rotations or other spatial transformations of the robot 104.

In the following description, the term "step" may be used to refer to any discrete movement of the robot 104, using any of the above-referenced movement components, or other movement components, or combinations thereof. Thus, a step could refer to a specified rotation of the robot 104, a flight of a certain distance of the robot 104, a defined number of rotations of wheels of the robot 104, or any other ones of the defined movement actions within the action space repository 120.

During operation, in order to identify and execute the approach path 110, the approach policy controller 102 initially utilizes a training manager 122. As illustrated in FIG. 1, the training manager 122 may include, or have access to, training data 124. The training data 124 may include simulations of suitable environments representing the environment 106, and/or may include real-world environmental data. In some examples below, the training data 124 may be referenced as ground truth data. For example, the training data 124 may include environments, included objects and their semantic labels, and map information that may be used to compute distances from points within the environments to the objects included therein.

As also described in detail below, the training manager 122 is configured to utilize the action space repository 120 and the training data 124 to train at least two machine-learning algorithms for future use in identifying and executing the approach path 110. As shown in FIG. 1, a first example of such machine-learning algorithms includes a feature representation generator 126. In example implementations, the feature representation generator 126 represents at least one convolutional neural network (CNN) that is configured to generate both semantic segmentation data 128 and depth information data 130.

In other words, the feature representation generator 126 is configured to receive an image of the environment 106 from the camera 116, including the object 108, and to utilize a suitable CNN to represent features of the obtained image, including both a semantic segmentation and a depth map thereof. Of course, during training operations of the training manager 122, such images are represented by simulated or actual training images obtained from the training data 124.

In general, a semantic segmentation refers to a pixel-by-pixel feature representation of an image, in which each pixel is associated with a semantic label. For example, a captured image may include an image of a table and a chair within a room. A semantic segmentation of such an image might include individual pixels labeled as one of table, chair, or room (or portion of room, such as floor, or wall).

The corresponding depth map of the same image, as an example of the depth information data 130, may include a per pixel depth or distance from the camera 116, or from the robot 104.

In the example implementations in which the feature representation includes both the semantic segmentation and corresponding depth map, each pixel of the row of an image may be associated with both a semantic label and a corresponding depth or distance from the robot 104. For example, a pixel of the image that occurs within the chair in the example above would be associated with a semantic label of "chair," and a distance from the robot 104 to a corresponding portion of the chair.

Further in FIG. 1, the training manager 122 may be configured to utilize the training data 124 to train a navigation policy generator 132. As shown in FIG. 1, the navigation policy generator 132 includes an action selector 134 that is configured to select and move an action from the action space repository 120. The navigation policy generator 132 also includes a reward evaluator 136, which is configured to evaluate a result of the movement action selected by the action selector 134 with respect to calculating the approach path 110, or corresponding approach paths associated with the training data 124.

Thus, during training, the training manager 122 may be configured to utilize the feature representation generator 126 to generate semantic segmentation and depth map representations of images from within the training data 124. The training manager 122 may then utilize the ground truth data of the training data 124 to compare the calculated feature representations with the ground truth feature representations. Over multiple iterations, and using training techniques such as those referenced below, the training manager 122 may be configured to parameterize the feature representation generator 126 in a manner that minimizes feature representation errors within the environment 106.

Similarly, assuming available feature representations, either from the training data 124 and/or from the trained feature representation generator 126, the navigation policy generator 132, during training, may output a probabilistic array of potential movement actions, including a movement action determined to have the highest probability of success. For example, the action selector 134 may analyze a relevant feature representation, and may determine that available movement actions of "move ahead," "move left," and "move right" have a predicted success percentage of 70%, 20%, and 10%, respectively.

In the simplified example, the action selector 134 may select a movement action of "move ahead." As referenced above, and described in detail below, the reward evaluator 136 would then use various described techniques to evaluate the level of success of the selected movement action. During training, the selected movement action and associated reward may be compared against the ground truth data of the training data 124. Consequently, over time and multiple iterations, the navigation policy generator 132 will be parameterized such that the action selector 134 and the reward evaluator 136 are properly configured to utilize feature representations from the feature representation generator 136 to iteratively determine the approach path 110 to the object 108 within the environment 106.

Thus, during training, and once trained, the approach policy controller 102 is configured to generate the approach path 110 in an incremental or iterative fashion, until the object 108 is reached. For example, once trained, the robot 104 may be placed within the environment 106, which may include a room with furniture, including a chair, as referenced above. The robot 104 may receive an approach request or similar instruction to move toward or otherwise approach the chair represented by the object 108.

To calculate the approach path 110, the approach policy controller 102 may initially request an image from the camera 116. Upon receipt, the feature representation generator 126 may proceed to generate a semantic segmentation and depth map of the image. As described, the resulting feature representation would thus include individual pixels labeled as chair and being associated with the corresponding distances from the robot 104.

Based thereon, the action selector 134 of the navigation policy generator 132 may proceed to select a first movement action from the action space repository 120. The navigation policy generator 132 may proceed to instruct the movement system 118 to execute the selected movement action, thus completing a first step of the approach path 110.

Subsequently, the approach policy controller 102 may instruct the camera 116 to obtain a second image. The feature representation generator 126 may again calculate a semantic segmentation and depth map, this time for the second image.

The reward evaluator 136 may evaluate a success of the previously-selected (e.g., first) movement action, based on the feature representation of the second image. For example, as described in detail below, an attention mask may be calculated with respect to the chair, and the reward evaluator 136 may quantify an extent to which the robot has successfully moved toward the chair as a result of the selected movement action. For example, the reward evaluator 136 may judge a relative size of the chair within the second image, relative to a corresponding representation within the first image, and in conjunction with the two calculated depth maps, in order to evaluate a success of the movement action.

Based on the evaluated reward and on the second feature representation of the second image, the action selector 134 may proceed to select a second movement action from the action space repository 120. In other words, the navigation policy generator 132 may thus instruct the movement system 118 to take a second step toward the chair represented by the object 108.

The above-described iterative process may continue to a third iteration, resulting in a third step toward the object 108. Iterations may continue until the approach path 110 is determined to be completed and the object 108 is determined to have been reached. In some implementations, the reward may be evaluated based only on a preceding movement action, or on a combination of a most-recent subset of movement actions, or cumulatively over all previous movement actions of the approach path 110 at the time of a current iteration.

In general, it will be appreciate that many different success conditions may be defined for identifying a successful or acceptable completion of the approach path 110. Such success conditions may depend on factors such as a form factor and capabilities of the robot 104, a nature of the approach request, and/or a nature of the object 108. For example, a success condition may be defined as achieving a minimum/threshold distance from the object 108.

A success condition may be defined in terms of success in completing the approach request. For example, if the approach request specifies retrieving the object 108, then success may be determined based on a successful onboarding of the object onto the robot 104 (e.g., the robot 104 is in a position to pick up the object 108 and/or place the object 108 within a compartment of the robot 104). Thus, evaluation of success conditions may leverage existing robot systems or subsystems, not explicitly illustrated in FIG. 1. For example, in the preceding use case, the robot 104 may include an onboarding system that is designed to evaluate whether an object to be retrieved is within range of an arm, pincer, or other onboarding tool, and the approach policy controller 102 may interface with such an onboarding system to evaluate a success condition of approaching the object 108.

Figure 2:
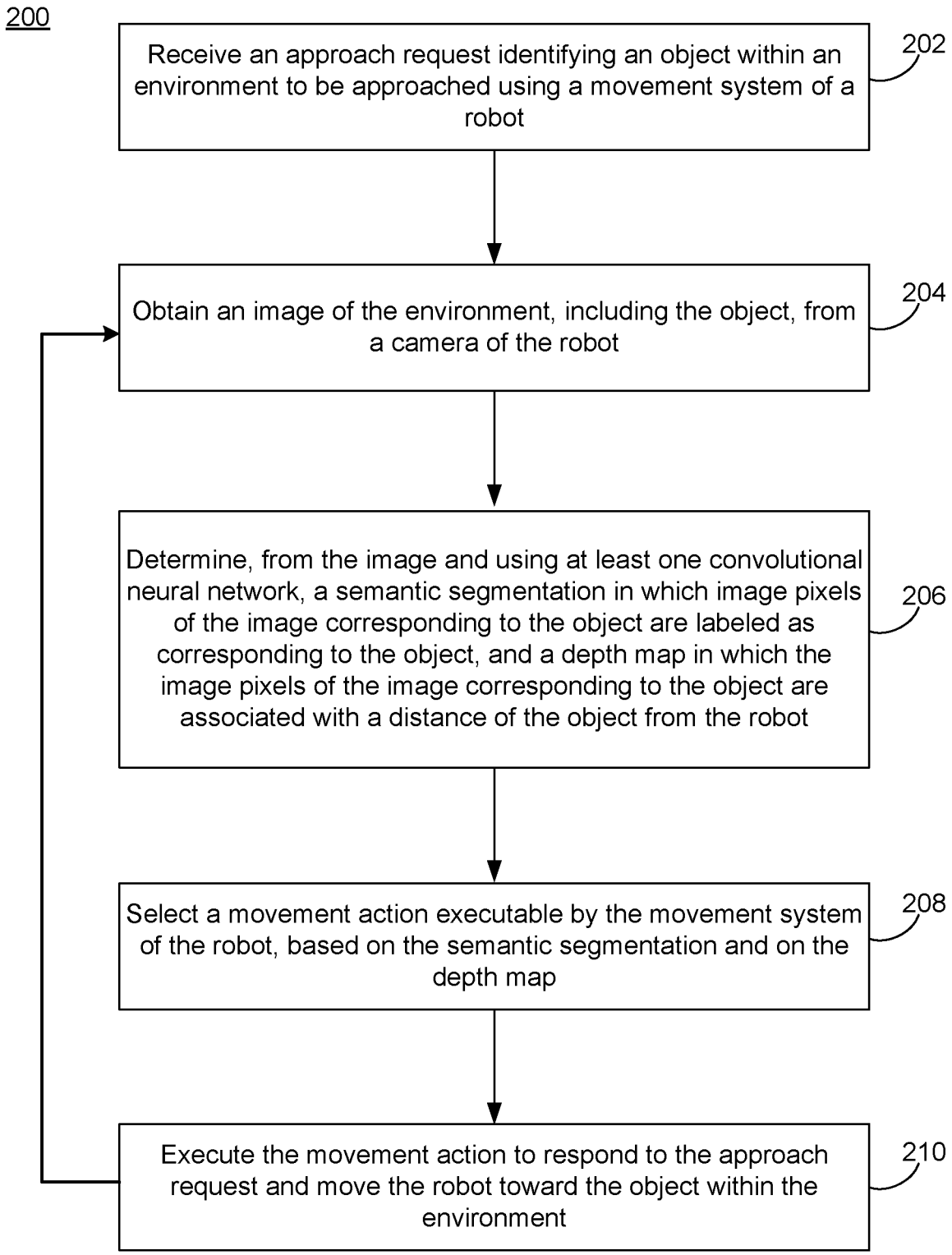
FIG. 2 is a flowchart illustrating example operations of the system of FIG. 1.

FIG. 2 is a flowchart illustrating example implementations of the system 100 of FIG. 1. In the example of FIG. 2, operations 202-210 are illustrated as separate, sequential operations. However, in alternative implementations, additional or alternative operations may be included, and one or more of the operations 202-210 may be omitted. In any such implementations, the various operations and sub-operations may be executed in a partially or completely overlapping or parallel manner, or in a nested, iterative, or branched fashion.

In the example of FIG. 2, an approach request is received that identifies an object within an environment to be approached using the movement system of a robot (202). For example, as referenced above, the approach policy controller of the robot 102 of the robot 104 may be configured to receive such an approach request with respect to the object 108 within the environment 106, using one or more of a number of potential input channels.

For example, the approach request may be received as a spoken command of a user, by way of an auditory input of the robot 104, or may be received by way of a separate hardware device of the user, and utilizing appropriate network interfaces. Approach requests may be singular, explicit commands, or may be implicit within one or more related commands. For example, a command to the robot 104 to retrieve a bottle of water may be associated with an implicit approach request for approaching a refrigerator.

The included object identification may also be implemented using any suitable form or format. For example, a chair may be identified simply using the word chair, or designated by some characteristic of the chair (e.g., the red chair), or may be identified based on its relation to some other object or aspect of the environment 106 (e.g., the chair by the table).

An image of the environment, including the object, may be obtained from the camera of the robot (204). For example, the feature representation generator 126 of the approach policy controller 102 may receive a first image of the object 108 within the environment 106, by way of the camera 116. In various implementations, the camera 116 may be configured to continually or periodically monitor the environment 106, so that the feature representation generator 126 may proceed to analyze previously-captured images that have been captured and stored. In other example implementations, the approach policy controller 102 may initiate an explicit command to the camera 116 to capture an image within the environment 106. In some implementations, the camera 116 may capture a plurality of images, perhaps from a corresponding plurality of positions of the robot 104. In other example implementations, the camera 116 may represent two or more cameras positioned at different locations on the robot 104.

Using at least one convolutional neural network, a semantic segmentation and depth map of the image be determined (206). The semantic segmentation may include labeling of image pixels of the image corresponding to the object. Meanwhile, in the depth map, image pixels of the image corresponding to the object are associated with the distance of the object from the robot. In the example implementations, described in detail below, the semantic segmentation and the depth map may be obtained from the image using a single convolutional neural network, or a single set of convolutional networks.

A movement action executable by the movement system of the robot may be selected, based on the segmentation and on the depth map (208). For example, the navigation policy generator 132 may be configured to select a movement action from the action space repository 120, using the action selector 134.

The movement action may be executed to respond to the approach request and move the robot toward the object within the environment (210). For example, the action selector 134 may issue a movement command to the movement system 118 with respect to the selected movement action from the action space repository 120, whereupon the movement system 118 may proceed to remove the robot 104 along a first step of the approach path 110 toward the object 108.

The operations 204-210 of FIG. 2 may proceed iteratively by obtaining a second image of the environment 106, and determining a second feature representation thereof (including a second semantic segmentation and second depth map). During such second and subsequent iterations, as described, the navigation policy generator 132 may also utilize the reward evaluator 136 with respect to at least one image of at least one preceding iteration as an additional basis of selection by the action selector 134.

For example, the second image and second feature representation may be utilized in comparison to the first image and the first feature representation to evaluate a relative level of success of the first movement action. The action selector 134 may thus use the resulting reward evaluation, in conjunction with the second feature representation, to select and execute a second movement action from the action space repository 120. In this way, the robot 104 may execute a second step of the approach path 110 toward the object 108. Third and subsequent iterative steps may be selected and executed, until the approach path 110 is completed and the object 108 has been successfully approached.

Figure 3:
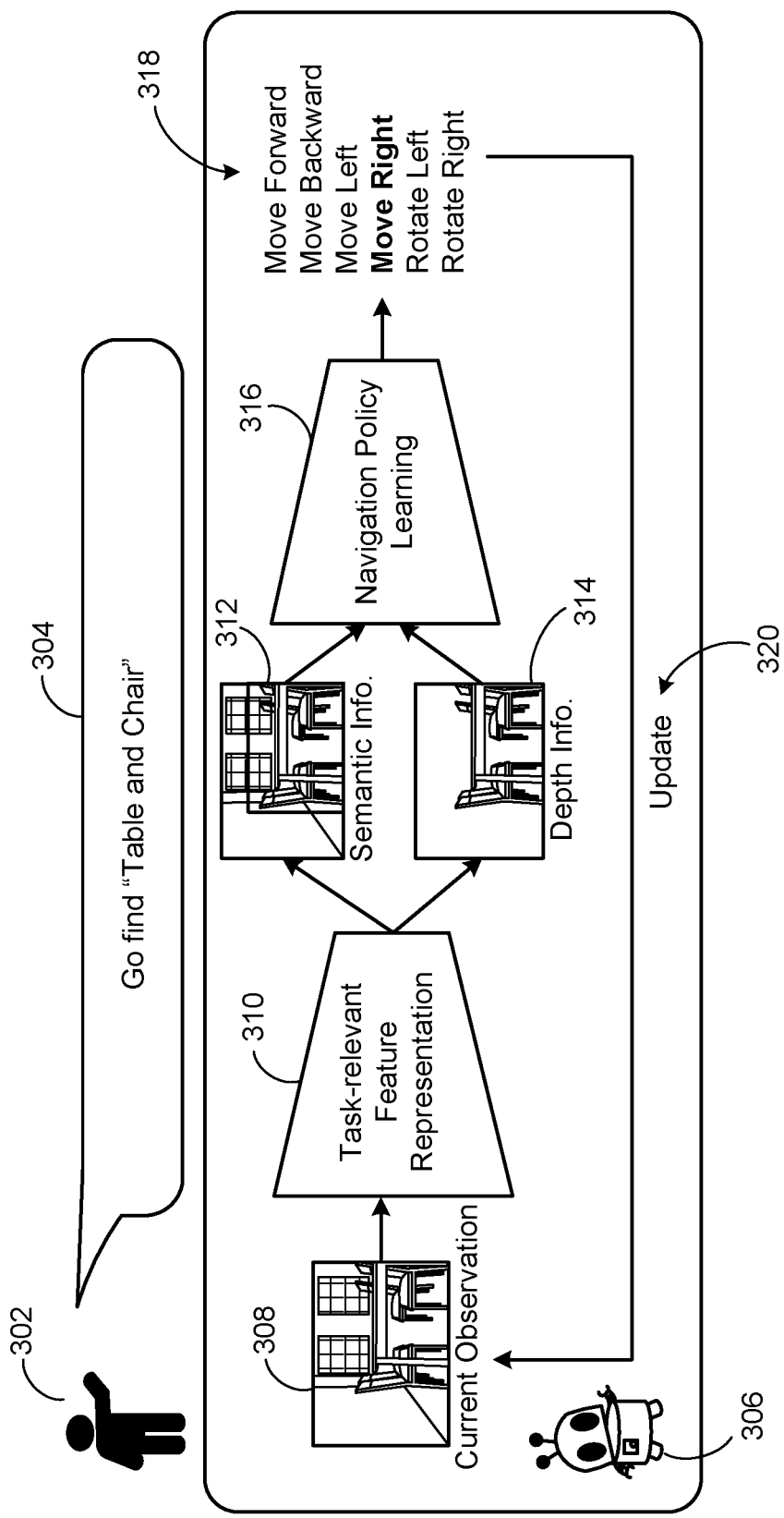
FIG. 3 is a block diagram with operational flows of an example implementation of the system of FIG. 1.

FIG. 3 is a block diagram with operational flows of an example implementation of the system of FIG. 1. As referenced above with respect to FIG. 1, FIG. 3 enables an autonomous robot to search and retrieve a desired object in an arbitrary environment, and enables a variety of applications, ranging from, e.g., caregiving for the elderly or infirm, to self-driving vehicles (e.g., to approach and pick-up passengers).

FIG. 3 provides an example implementation demonstrating the type of joint learning method using visual recognition and planning for obtaining end-to-end learning as described with respect to FIGS. 1 and 2. Specifically, as shown, a user 302 may issue an approach request within a room, such as "go find 'table and chair'" 304, to a robot 306. Then, the robot 306 learns or executes an optimal action policy to reach the goal state (e.g., reaching the 'table and chair'), by maximizing a reward it receives from the environment as the robot 306 moves towards the, e.g., 'table and chair.' Under the "robot that finds objects" setting, the goal state is the location of the target object with a high reward assigned.

In FIG. 3, it is again assumed that the desired approaching task is commenced with the robot being initialized in a state in which the target object is visible to a camera of the robot 306, and the task or goal is to attempt to minimize a number of steps needed to achieve the task or goal. The goal may alternatively be stated in terms of minimizing other parameters, such as a time or distance needed.

In FIG. 3, mapping occurs from visual signals, such as an image 308, to navigation or movement actions 318, using a deep reinforcement learning paradigm for model training. To accomplish this and related goals, the system of FIG. 3 does not require direct mapping of the image 308 to an optimal action of the actions 318 directly, and instead utilizes information within the image 308 to infer and deduce the actions needed to reach the goal state. Consequently, for example, the system of FIG. 3 does not require encoding of local map information of the relevant environment, which tends to be overly-specific to an individual setting or context (e.g., may be prone to encoding environment-dependent features). As a result, re-training or fine-tuning to update model parameters to approach a new object within a new environment is not required, or is minimized.

Instead, in FIG. 3, a task-relevant feature representation module 310, representing an example of the feature generator 126 of FIG. 1, may be trained and otherwise configured to provide semantic information 312 and depth information 314, to thereby obtain task-relevant features from the image 308. As further illustrated, the semantic information 312 and depth information 314 serve as the input to a navigation policy learning module 316, which illustrates an example of the navigation policy generator 132, and provides a deep reinforcement learning model for training the desired action policy.

In FIG. 3, the input image 308 may represent an RGB (red, green, blue) image, in which the image 308 is represented using an m-by-n-by-3 data array that defines red, green, and blue components for each pixel of the image 308. Each pixel color is represented using a combination of the red, green, and blue intensities at the pixel's location. However, other image formats may be used.

The approach command 304 is assumed to include, or correlate with, available semantic labels. In this way, for example, the system of FIG. 3 is flexible to appearance changes of the target object in the same or similar semantic category. For example, many different types or colors of chairs, of varying sizes, may be recognized in response to an approach request that includes the word 'chair.'

Thus, the robot 306 may start at a location at which a target object may be imaged to obtain a first image as the image 308. With the current (first) image, the robot 306 uses the structure of FIG. 3 to select a first movement action from available movement actions 318. As referenced above, and described in detail, below, update 320 is provided regarding results of the first movement action. In other words, results of the first movement action are evaluated, and used to provide the update 320.

Together with the update 320, a second image, obtained at the second, updated location, may be used to select a second movement action from the available movement actions 318. As referenced above, a current iteration may be executed based on an immediately-preceding iteration, or some subset thereof, or on all preceding iterations, or combinations thereof. Iterations continue until success of the approach task is determined.

Figure 4:
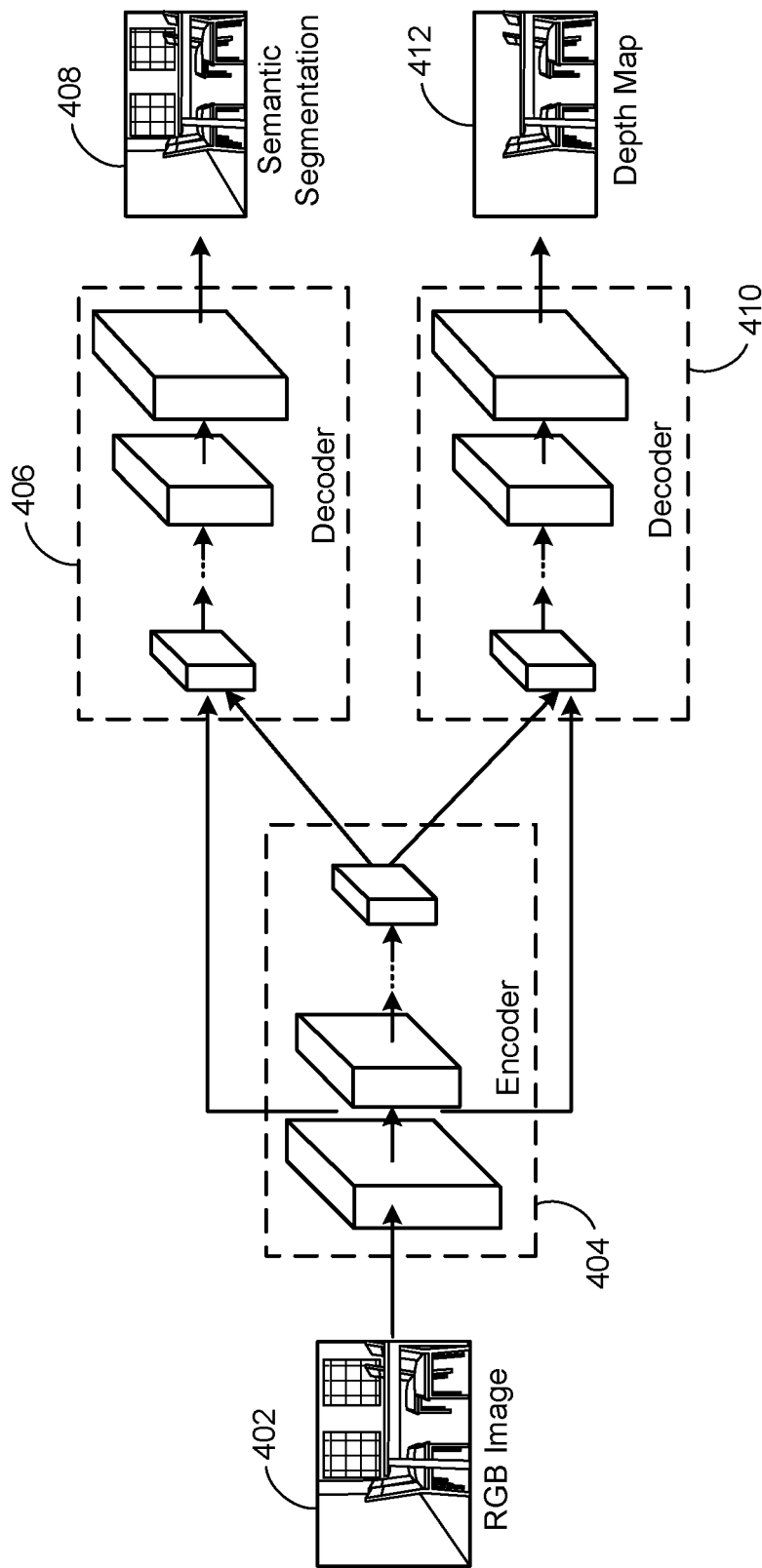
FIG. 4 is a block diagram of an example implementation of task-relevant feature representation techniques that may be used in the example of FIG. 3.

FIG. 4 is a block diagram of an example implementation of task-relevant feature representation techniques that may be used in the example of FIG. 3. In FIG. 4, the RGB image is input to an encoder structure 404, referred to herein as encoder 404, and two separate decoder branches 406 and 410 are spawned to form semantic segmentation 408 and depth map 412, respectively. That is, as referenced above with respect to FIG. 1, semantic segmentation 408 and depth map 412 are examples of the type of semantic information 312 and depth information 314 illustrated in FIG. 3, so that each pixel of the image 308 is associated with both a semantic label a depth value.

In FIG. 4, the encoder 404 and decoders 406/410 are used to implement a deep learning model in which the encoder 404 may represent one or more neural networks, such as CNNs, that input an image and output a feature map. The decoder 406 is another neural network, perhaps of the same or similar type, but reversed, that translates the encoded feature map into a correlated output, i.e., semantic segmentation 408.

The encoder 404 may be implemented using one or more known or future techniques. For example, the encoder 404 generally may use multiple CNNs having varying characteristics and trained to detect different features within the image 308, so that multiple (convolutional) layers of the encoder 404 correspond go the multiple, different features. Information within one or more of the convolutional layers may be processed through the use of pooling layers, which operate on the convolutional layers (alone or in combination) to condense the information contained therein.

For example, such pooling effectively serves to recognize specific visual features or types of features within an image, without necessarily retaining specific location information for each such feature within the image (e.g., recognizing a boundary, edge, or shape, without identifying a specific location thereof within an image). Put another way, pooling may effectively increase a receptive field of a pooled layer(s), while decreasing a resolution or other information. While useful from a computational efficiency standpoint, the semantic segmentation 408 typically requires such location information for successful or optimal implementation of FIG. 4.

Therefore, the encoder/decoder architecture of FIG. 4 may be used to implement pooling layers to reduce spatial dimensions using the encoder 404, while the decoder 406 is used to recover object details and spatial dimensions. As illustrated in FIG. 4, shortcut connections may be used between layers of the encoder 404 to the decoder 406, e.g., to assist in recovering object details. Further, a technique(s) known as dilated convolution or atrous convolution may be used to increase a field of view with respect to a convolutional layer, without reducing spatial dimensions.

For example, the encoder 404 may use a pooling technique known as spatial pyramid pooling to encode multi-scale contextual information within the image 308. For example, a model such as ResNet-101, Xception, or other pre-trained model may be leveraged to identify many different types of objects using multiple layers of the encoder 404. Then, the resulting, computed feature map(s) may be processed using pooling operations with different field-of-views. The decoder 406 may be configured to gradually up-sample the encoder's output to recover spatial information and capture sharp object boundaries, thereby obtaining high-quality semantic segmentation results.

Put another way, the encoder 404/decoder 406 structure provides the advantages of both spatial pyramid pooling and an encoder-decoder structure. Specifically, the former approach provides rich contextual information by pooling features at different resolutions (scales), while the latter provides sharp object boundaries.

Further in FIG. 4, the second decoder branch 410 may be spawned, and may take advantage of correlations between semantic segmentation and depth information to jointly predict both. Specifically, the architecture for depth information may be the same or similar to that of the semantic segmentation, but with an alternative output layer. For example, instead of a classification layer that outputs labels for corresponding pixels, as in semantic segmentation, the decoder 410 may utilize a regression layer to predict a depth value for each pixel.

In a more specific example implementation, the training data 124 of FIG. 1 may include a known training dataset, such as the publicly-available ImageNet, which may be used to pre-train the types of models referenced above, such as Xception (e.g., Xception-65). The loss function of Equation 1 may be used to train the model of FIG. 4 in an end-to-end manner:

$$L = \frac{1}{N}\sum_{i}^{N}(-p_i^* \log(p_i)) + \lambda \frac{1}{N}\sum_{i}^{N} \|d_i - d_i^*\|_2^2 \quad \text{Equation 1}$$

In Equation 1, the first term represents a cross entropy loss for semantic segmentation. The term $p_i^*$ represents a one-hot encoded ground truth semantic label for a given pixel "i" (where 'one-hot' refers to a group of bits or labels in which a single bit/label has a value, and remaining bits/labels have a value of zero, or no value). Meanwhile, $p_i$ represents corresponding predicted probabilities over all available/possible semantic labels, for that pixel.

Further in Equation 1, the second term is the mean-square error for depth prediction, where $d_i^*$ denotes the ground truth depth value for a particular pixel "i" and $d_i$ represents the corresponding predicted depth value. Further, "N" denotes the total number of pixels in the image and λ denotes a balancing factor that may be trained empirically. The model of FIG. 4 may be trained by minimizing the loss function of Equation 1 using an appropriate optimization function, such as the stochastic gradient descent (SGD) optimization.

Figure 5:
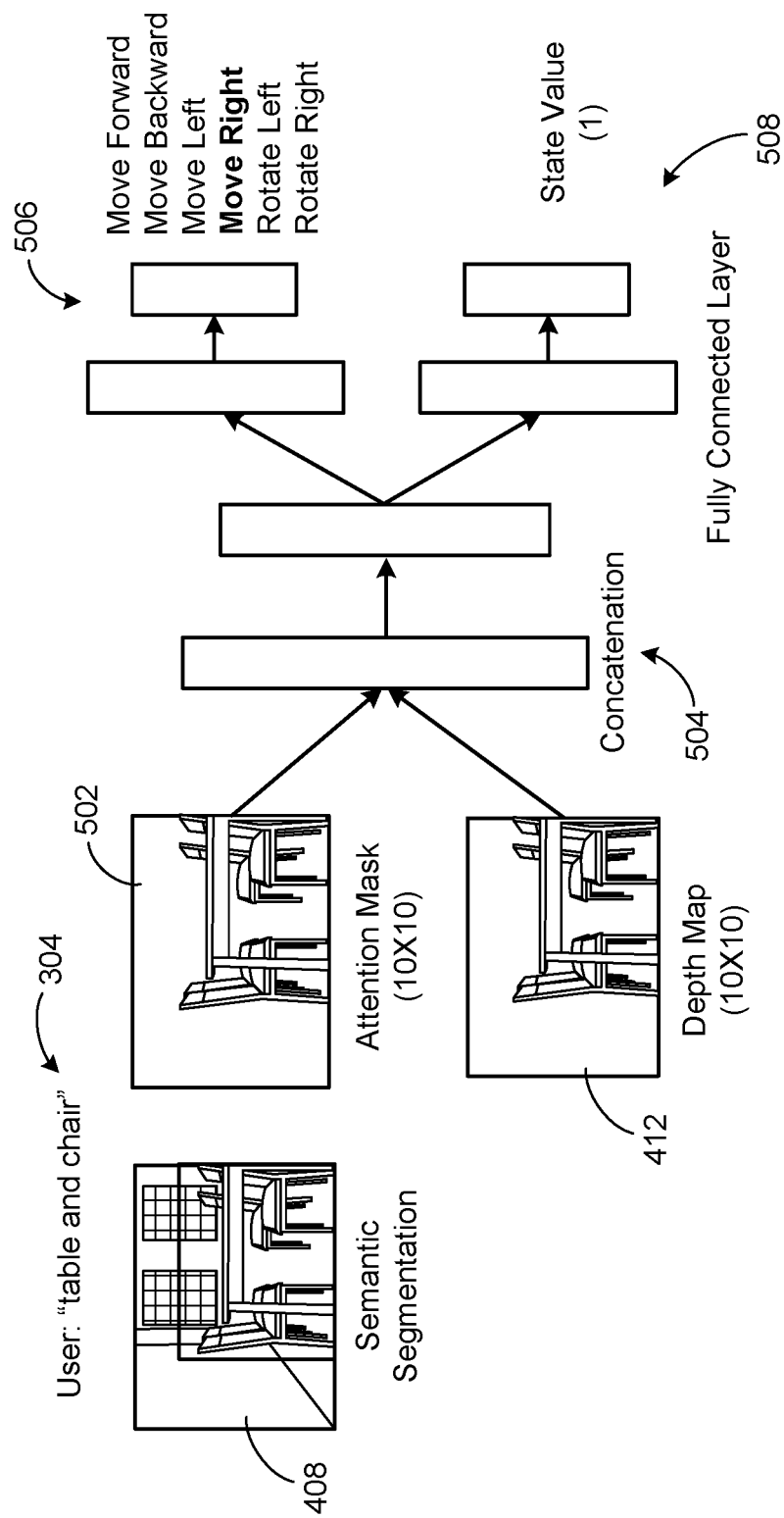
FIG. 5 is a block diagram of an example implementation of an architecture of an example deep reinforcement learning model for action policy training that may be used in the example of FIG. 3.

FIG. 5 is a block diagram of an example implementation of an architecture of an example deep reinforcement learning model for action policy training that may be used in the example of FIG. 3. In other words, FIG. 5 provides an example implementation of the navigation policy learning module 316 of FIG. 1.

In FIG. 5, as may be appreciated from the above descriptions of FIGS. 1-3, it is assumed that the semantic segmentation 408 and depth map 412 of FIG. 4 have been computed and are available, and that the robot 306 is expected to make a decision of which navigation or movement action to take to approach the target object.

Thus, FIG. 5 represents a deep neural network used to estimate navigation policy functions, where the policy network uses the semantic segmentation and depth information and provides a probability distribution over all valid movement actions. The robot 306 may thus pick a valid action, based on the probability distribution. In some cases, the robot 306 may select a movement action with the highest probability of success, but in other implementations, the robot 306 may pick a movement action randomly from the distribution, or using some other selection technique.

After performing the movement action, the robot 306 receives a reward signal as a measurement of how beneficial the performed action is towards the goal. This one-step reward (or, in other implementations, accumulated rewards after taking multiple steps) may be used as a weight factor of taking the performed action as the ground truth action for training.

In the present description, as referenced above, a state of the robot 306 refers generally to, or is represented by, a current, corresponding image of the robot 306 at its current position, along with the semantic label of the target object (as determined from the semantic segmentation or subset thereof). Thus, a state space of the robot 306 refers to all available or possible image/semantic label combinations. In particular, neither the robot's position nor the target object's location is required to be known.

In FIG. 5, the semantic segmentation 408 is illustrated as being used together with the semantic label of the target object 304 as contained therein to generate (e.g. further encode) an attention mask 502. For example, the attention mask 502 may be constructed as a 10×10 matrix, with a higher focus on the target object.

More specifically, the attention mask 502 and the depth map 412 together may be used to represent the robot's state. In addition, the size of the attention field also encodes how close the robot is to the target object. That is, e.g., as the robot 306 moves closer to the target object, a relative size of the target object will be larger.

Thus, a threshold may be set with respect to the attention mask 502, and goal states may be defined as those states having an attention field larger than the threshold. For example, during training, a ground truth image may be used to determine ground truth attention masks. Then, the threshold may be set as the size of $n^{th}$ largest attention field among all ground truth attention masks to yield "n" goal states. For example, the threshold may be set as the size of the $5^{th}$ largest attention field among the ground truth attention masks to yield 5 goal states.

A suitable reward function may be utilized. Such reward functions may ensure progression towards the target object, while also avoiding scenarios in which the robot 306 is stuck or delayed in a suboptimal state. The reward may be defined as the size of the attention field, if and only if the attention field is larger than all previous ones the robot 306 has observed during the approach. Otherwise, the reward is set to be zero. The cumulative reward may be formally defined as: $\gamma^{i1}a_{i1}+\gamma^{i2}a_{i2}+\ldots+\gamma^{it}a_{it}$, where $a_i$ denotes the size of the attention field at time step i, and $\gamma$ is the discount factor for time penalty, and $a_{i1}<a_{i2}<\ldots<a_{it}$ (i1<i2<...<it).

In FIG. 5, after resizing both the attention mask and the depth map to the size of, e.g., 10 by 10, the attention mask 502 and depth map 412 may undergo concatenation 504 into a joint vector. A fully connected layer 505 may be used to generate an embedding fusion, which is then fed into two separate branches 506, 508, each of which includes two additional fully connected layers, to predict action policy and the state value, respectively. As described, the state value may be defined as the expected cumulative reward the robot 306 would receive at the current state.

A suitable training protocol may be followed. For example, the model of FIG. 5 may be trained by running multiple threads in parallel, where each thread updates the weights of the global shared network asynchronously. In some implementations, rather than assigning each thread a specific environment-target pair, a scheduler may be used to train all environment-target pairs equally, in case certain environment-target pairs are much easier to train.

Figure 6:
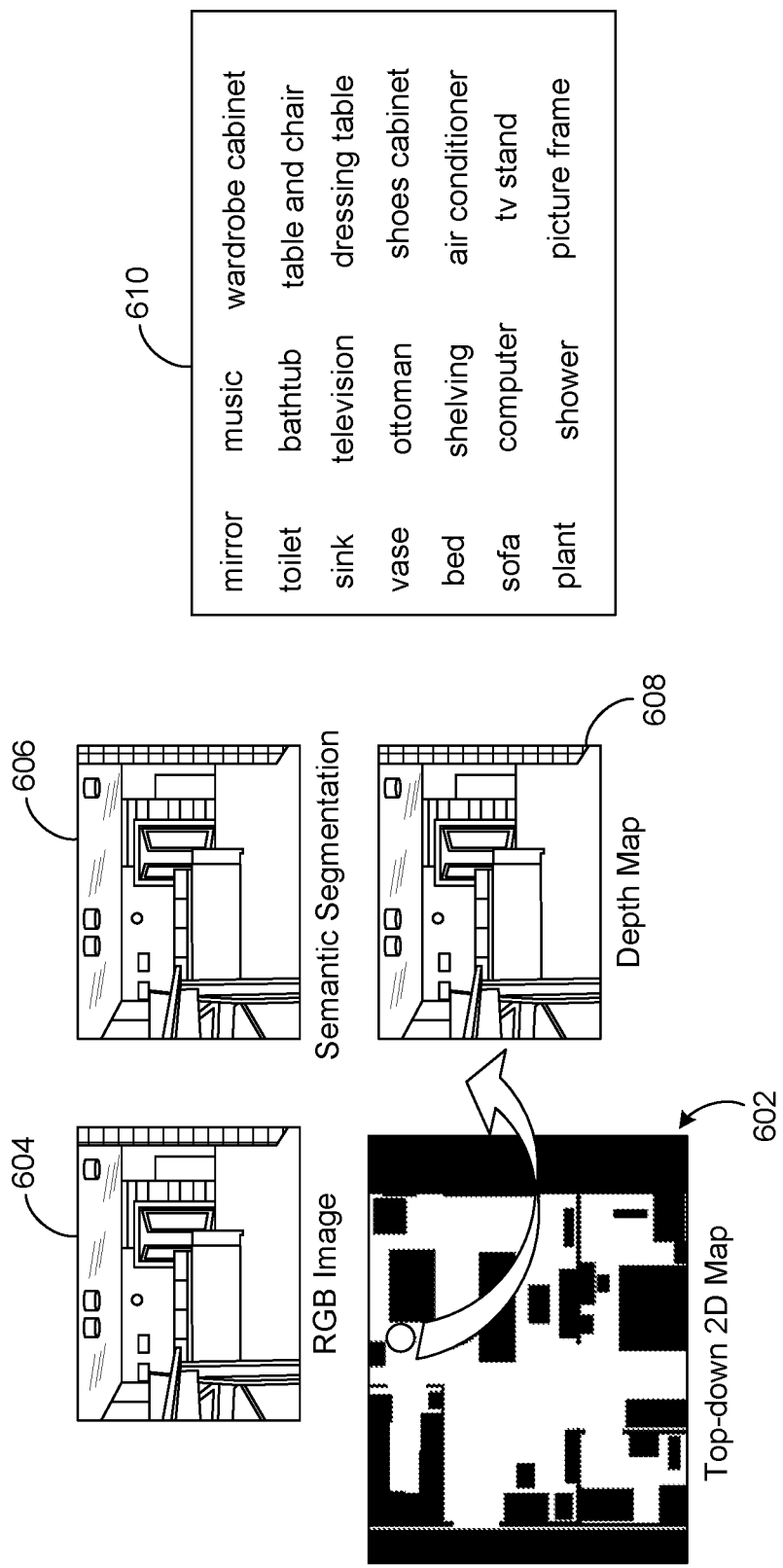
FIG. 6 illustrates an example environment and example objects that may be contained therein and represented using the techniques described herein.

FIG. 6 illustrates an example environment and example objects that may be contained therein and represented using the techniques described herein. In FIG. 6, during training, the robot 306 is assumed to have access to an environment map 602, first-person RGB images 604, and corresponding ground truth semantic segmentation 606 and depth map 608.

For purposes of the example, the robot 306 may be constrained to a defined movement action space of actions, e.g., discrete actions such as moving 0.2 meters or rotating 90 degrees. It also discretizes the environment into a set of reachable locations.

In order to train the feature representation module (e.g., 126 in FIG. 1, or 310 in FIG. 3) for semantic segmentation and depth prediction, RGB images may be collected, as well as their corresponding ground truth data captured at all relevant locations from relevant environments. Following appropriate filtering and sampling, semantic segmentation may be conducted with respect to a set of semantic labels 610.

Conventional metrics, such as, e.g., mean Inter-section Over Union (mean IOU) and Root Mean Square Error (RMSE), may be used to evaluate and report the performance of the trained models in performing semantic segmentation and depth prediction.

By way of more general description, the goal of deep reinforcement learning is to learn a policy model $\pi$ that maps a state "s" to the most beneficial action "a" (or an action distribution from which the most beneficial action can be drawn with a high probability), i.e. to let $\pi(s)=a$. This most beneficial action "a," is acquired by the intelligent agent's trial and error interactions with the environment.

For the object-approaching task described herein, the most beneficial action "a" depends on the local map between the current location and the goal location. In order to let $\pi(s)=a$, since the input "s" is not required to provide any map information directly, then the model $\pi$ has to capture such information from the input "s" through learning.

In the present description, the described feature representation model, referred to here as "f," is used to learn the semantic segmentation and depth map from the input state "s," as described above. In this way, the semantic segmentation and the depth map may be used as the inputs to the (navigation) policy model $\pi$. In other words, $\pi(f(s))=a$. Effectively, the depth map may be understood to provide an input to the policy network $\pi$ that encodes the local map. In such a way, the policy model $\pi$ is not the only source for effectively capturing the local map information. At the same time, the feature representation model "f" directly learns the depth map from the state "s" in an efficient manner.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   receive an approach request identifying a target object within an environment, wherein the approach request indicates that the target object is to be approached using a movement system of a robot;
   obtain an image of the target object within the environment of the robot;
   determine, from the image, a semantic segmentation in which image pixels of the image corresponding to the target object are labeled with a semantic label corresponding to the target object;
   determine a depth map in which the image pixels of the image with the semantic label corresponding to the target object are associated with a distance of the target object from the robot;
   generate an attention mask based on the semantic segmentation and the target object identified in the approach request;
   select a movement action based on the attention mask and on the depth map using a navigation policy generator, wherein the navigation policy generator is trained using reinforcement learning; and
   execute the movement action to move the robot toward the target object within the environment.

2. The computer program product of claim 1, wherein the instructions, when executed, are further configured to cause the at least one computing device to:
   train at least one convolutional neural network to generate the semantic segmentation and the depth map using a single encoder structure, with a first decoder branch trained to generate the semantic segmentation using the encoder structure and a second decoder branch trained to generate the depth map using the encoder structure.

3. The computer program product of claim 1, wherein the instructions, when executed to select the movement action, are further configured to cause the at least one computing device to:
   train the navigation policy generator to use at least one additional convolutional neural network to utilize ground truth semantic information and depth information to predict at least one movement action from among a plurality of available movement actions available to the robot within the environment.

4. The computer program product of claim 3, wherein the instructions, when executed to select the movement action, are further configured to cause the at least one computing device to:
   use the trained navigation policy generator to represent a state of the robot, relative to the target object, using the attention mask and the depth map, wherein the movement action is selected based on the state of the robot.

5. The computer program product of claim 4, wherein the instructions, when executed to select the movement action, are further configured to cause the at least one computing device to:
   execute the trained navigation policy generator to generate a probabilistic distribution of movement actions from among the plurality of available movement actions, based on the state of the robot; and
   select the movement action from the probabilistic distribution of movement actions.

6. The computer program product of claim 5, wherein the instructions, when executed, are further configured to cause the at least one computing device to:
   obtain a second image of the target object from a camera of the robot, following execution of the movement action;
   determine a second semantic segmentation and a second depth map, using at least one convolutional neural network;
   select, using the trained navigation policy generator, a second movement action, based on the second semantic segmentation, the second depth map, and the state of the robot following the movement action; and
   execute the second movement action to move the robot toward the target object within the environment.

7. The computer program product of claim 1, wherein the instructions, when executed, are further configured to cause the at least one computing device to:
- obtain a second image of the target object from a camera of the robot, following execution of the movement action;
- determine a second semantic segmentation and a second depth map, using at least one convolutional neural network and the second image;
- select a second movement action, based on the second semantic segmentation, the second depth map, and a state of the robot following the movement action, relative to a preceding state of the robot prior to the movement action; and
- execute the second movement action to move the robot toward the target object within the environment.

8. The computer program product of claim 7, wherein the instructions, when executed, are further configured to cause the at least one computing device to:
- continue further iterations of
  - obtaining a current image of the target object following a preceding movement action,
  - determining a current semantic segmentation, current depth map, and current state, based on the current image,
  - selecting a current movement action, based on the current semantic segmentation, the current depth map, and the current state,
  - executing the current movement action, and
  - evaluating whether the current movement action achieves a success condition of an approach request; and
- complete the approach request when the evaluation indicates the success condition has been reached.

9. The computer program product of claim 1, wherein the attention mask comprises a 2-dimensional matrix whose values indicate a focus on the target object.

10. A robot comprising:
- a movement system configured to receive an approach request identifying a target object within an environment, wherein the approach request includes an instruction to move the robot and approach the target object;
- a camera configured to capture an image of the target object within the environment; and
- a control system configured to fulfill the approach request including executing iterations of moving the robot towards the target object through a plurality of iterative movements until an approach success condition is reached, the iterations including
  - determining, from a first image from the camera and using at least one convolutional neural network, a first semantic segmentation in which image pixels of the image corresponding to the target object are labeled with a semantic label corresponding to the target object in the approach request, a first depth map, and a first state of the robot, relative to the target object;
  - generate a first attention mask based on the first semantic segmentation and the target object identified in the approach request;
  - determining a first movement action of the robot, using the first attention mask, the first depth map, and the first state, wherein the first movement action is selected using a navigation policy generator, and wherein the navigation policy generator and the at least one convolutional neural network are trained using reinforcement learning;
  - executing the first movement action of the robot toward the target object within the environment;
  - determining a second semantic segmentation, a second depth map, and a second state of the robot, relative to the target object, using a second image from the camera;
  - generate a second attention mask based on the second semantic segmentation and the target object identified in the approach request;
  - determining a second movement action of the robot, using the second attention mask, the second depth map, and the second state, relative to the first state; and
  - executing the second movement action of the robot toward the target object within the environment.

11. The robot of claim 10, wherein the control system is configured to determine each semantic segmentation and depth map using at least one trained convolutional neural network with a single encoder structure, with a first decoder branch trained to generate each semantic segmentation using the encoder structure and a second decoder branch trained to generate each of the first depth map and the second depth map using the encoder structure.

12. The robot of claim 10, wherein the control system is configured to determine each movement action including:
- executing the trained navigation policy generator including at least one additional convolutional neural network to generate a probabilistic distribution of movement actions from among a plurality of available movement actions, based on a current state of the robot during the iterations; and
- selecting a current movement action from the probabilistic distribution of movement actions.

13. The robot of claim 10, wherein each state of the robot is defined with respect to a semantic label of the target object within each semantic segmentation, and a corresponding distance of the target object from the robot, as determined from each of the first depth map and the second depth map.

14. A method comprising:
- receiving an approach request identifying a target object within an environment to be approached using a movement system of a robot;
- obtaining an image of the environment, including the target object, from a camera of the robot;
- determining, from the image and using at least one convolutional neural network, a semantic segmentation in which image pixels of the image corresponding to the target object are labeled with a semantic label corresponding to the target object in the approach request;
- determining, using the at least one convolutional neural network, a depth map in which the image pixels of the image with the semantic label corresponding to the target object are associated with a distance of the target object from the robot;
- generating an attention mask based on the semantic segmentation and the target object identified in the approach request;
- selecting a movement action executable by the movement system of the robot, based on the attention mask and on the depth map, using a navigation policy generator, wherein the navigation policy generator and the at least one convolutional neural network are trained using reinforcement learning; and
- executing the movement action to respond to the approach request and move the robot toward the target object within the environment.

15. The method of claim 14, comprising:
training the at least one convolutional neural network to generate the semantic segmentation and the depth map using a single encoder structure, with a first decoder branch trained to generate the semantic segmentation using the encoder structure and a second decoder branch trained to generate the depth map using the encoder structure.

16. The method of claim 14, further comprising:
training the navigation policy generator that includes at least one additional convolutional neural network to utilize ground truth semantic information and depth information to predict at least one movement action from among a plurality of available movement actions available to the robot within the environment.

17. The method of claim 16, wherein selecting the movement action further comprises:
using the trained navigation policy generator to represent a state of the robot, relative to the target object, using the attention mask and the depth map, wherein the movement action is selected based on the state of the robot.

18. The method of claim 14, further comprising:
obtaining a second image of the target object, following execution of the movement action;
determining a second semantic segmentation and a second depth map, using the at least one convolutional neural network and the second image;
selecting a second movement action, based on the second semantic segmentation, the second depth map, and a state of the robot following the movement action, relative to a preceding state of the robot prior to the movement action; and
executing the second movement action to move the robot toward the target object within the environment.

19. The method of claim 18, further comprising:
continuing further iterations of
  obtaining a current image of the target object following a preceding movement action,
  determining a current semantic segmentation, current depth map, and current state, based on the current image,
  selecting a current movement action, based on the current semantic segmentation, the current depth map, and the current state,
  executing the current movement action, and
  evaluating whether the current movement action achieves a success condition of the approach request; and
completing the approach request when the evaluation indicates the success condition has been reached.

20. The method of claim 14, wherein the attention mask comprises a 2-dimensional matrix whose values indicate a focus on the target object.

* * * * *